United States Patent [19]
Lloyd

[11] 3,910,049
[45] Oct. 7, 1975

[54] FUEL TRAP EVACUATION SYSTEM

[75] Inventor: Richard J. Lloyd, Huntington Beach, Calif.

[73] Assignee: The Garrett Corporation, Los Angeles, Calif.

[22] Filed: Jan. 30, 1974

[21] Appl. No.: 438,093

[52] U.S. Cl. .................................................. 60/605
[51] Int. Cl.² ........................................ F02B 33/44
[58] Field of Search ........ 60/39.09 F, 39.09 R, 605, 60/606, 611, 617, 618; 261/DIG. 55, DIG. 21

[56] References Cited
UNITED STATES PATENTS

| 1,017,186 | 2/1912 | Stewart | 261/DIG. 55 |
| 1,618,139 | 2/1927 | Ryder | 261/DIG. 55 |
| 2,083,752 | 6/1937 | Trussell | 261/DIG. 55 |
| 2,849,992 | 9/1958 | Stillebroer et al. | 60/605 |
| 3,200,580 | 8/1965 | Millar | 60/605 |
| 3,577,726 | 5/1971 | Wagner | 60/605 |

FOREIGN PATENTS OR APPLICATIONS

| 270,927 | 5/1927 | United Kingdom | 60/605 |
| 1,056,426 | 10/1953 | France | 60/605 |

Primary Examiner—C. J. Husar
Assistant Examiner—L. T. Casaregola
Attorney, Agent, or Firm—Albert J. Miller; Alan E. Kopecki

[57] ABSTRACT

Disclosed is a system for evacuating accumulated fuel from a turbocharger or related ducting on a carbureted engine.

6 Claims, 2 Drawing Figures

U.S. Patent   Oct. 7,1975   3,910,049

3,910,049

FUEL TRAP EVACUATION SYSTEM

BACKGROUND OF THE INVENTION

Turbochargers have been used extensively for many years to increase the power of diesel engines. A centrifugal compressor driven by an exhaust gas turbine can provide compressed air to the diesel engine. To-date, however, turbochargers have not been extensively employed on gasoline powered engines.

One of the problems associated with turbocharging a gasoline engine, which is normally carbureted, is the collection of fuel in the turbocharger compressor or in the ducting associated with the turbocharger compressor. While this problem can be easily solved by mounting the turbocharger high enough above the engine to insure that any fuel collected therein will drain freely to the engine cylinders, space limitations in most automotive applications prohibit such an arrangement. In other words, to mount the turbocharger at a sufficient height to accomplish proper draining would require a bubble in the hood over the engine. For many reasons this is undesirable.

SUMMARY OF THE INVENTION

In order to overcome the accumulation of fuel in the turbocharger compressor or associated ducting, pumping means is provided to pump any trapped or accumulated fuel from the turbocharger compressor or associated ducting to the engine intake manifold.

DESCRIPTION OF THE PREFERRED EMBODIMENTS

Figure 1:
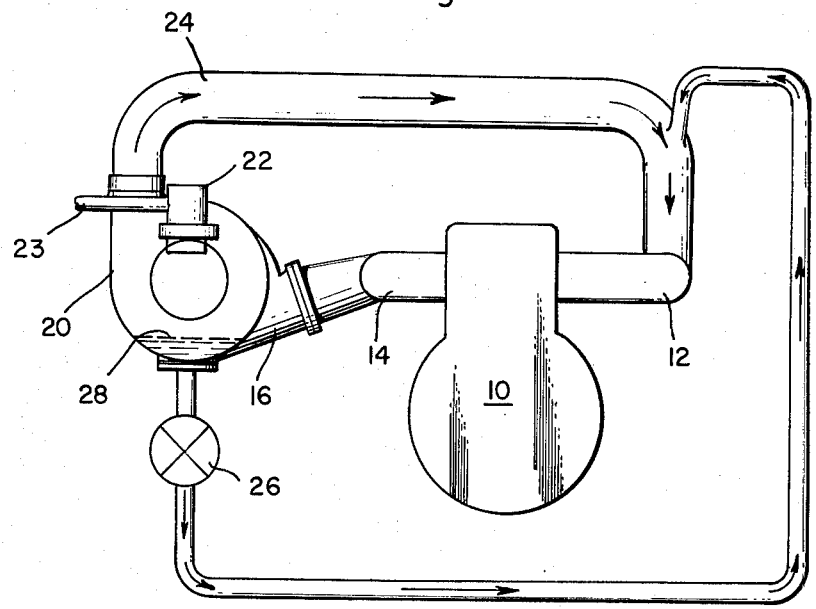
FIG. 1 is a schematic of a turbocharged carbureted engine having the pumping means of the present invention.

As shown in FIG. 1, engine 10 is provided with an intake manifold 12, which delivers a mixture of fuel and air to the engine 10, and an exhaust manifold 14 which carries heated exhaust gases from the engine 10. These exhaust gases from this exhaust manifold 14 are directed to the turbine 16 of the turbocharger 18 to drive the turbine 16 at high speeds. The turbocharger 18 also includes a compressor 20 on the same shaft as the turbine 16 which is thus driven thereby.

A carburetor 22 having a fuel inlet line 23 is operably associated with the turbocharger compressor 20 to provide fuel to the air being compressed in the compressor 20. A compressor outlet duct 24 delivers a compressed air and fuel mixture from the turbocharger compressor 20 to the intake manifold 12 of the engine 10.

Since the turbocharger compressor 20 is below the level of the intake manifold 12, fuel 28 can be collected or trapped in the bottom of the compressor 20 during periods of low air velocity through the ducting which occurs during engine idling and low load and speed conditions. During periods of high air velocity, at high engine speeds and loads, the accumulated fuel can be carried along with the air stream and thus over-richen the air/fuel mixture. Since over-richening the air/fuel mixture can increase hydrocarbon and carbon monoxide emissions, particularly during cold starting of the engine, it is imperative that some means be provided to remove this fuel 28 from the bottom of the compressor 20 on a continuous basis rather than permitting it to be accumulated and introduced into the engine in quantity.

Accordingly, a pumping means 26 is operationally disposed near the bottom of the compressor 20 to pump this trapped fuel 28 into the compressor outlet duct 24 at a point where the fuel will mix with the compressed air and fuel from the turbocharger compressor 20 and drain to the engine intake manifold 12. A mechanical pump or fluidic mechanism would be suitable as the pumping means 26. Any available source of power, electrical, hydraulic, vacuum, etc. could be used to drive the pumping means 26.

Figure 2:
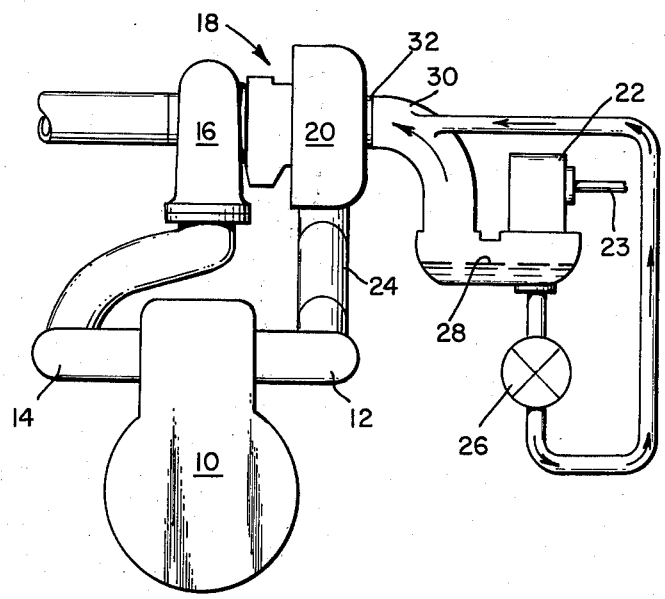
FIG. 2 is a schematic of a turbocharged carbureted engine having an alternate embodiment of the pumping means of the present invention.

In FIG. 2, the turbocharger 18 is mounted above the engine 10. The carburetor 22 mounted upon adaptor 30 is, however, below the level of the turbocharger 18. Accordingly, fuel 28 can be accumulated or trapped in the bottom of the adaptor 30 which delivers a mixture of fuel and air to the turbocharger 18.

Accordingly, pumping means 26 is provided below the adaptor 30 to drain accumulated fuel 28 therefrom and deliver it to the engine 10 through the compressor inlet 32 and compressor outlet duct 24.

While specific embodiments of the invention have been illustrated and described, it is to be understood that these are provided by way of example only and that the invention is not to be construed as being limited thereto, but only by the proper scope of the following claims.

I claim:

1. In combination:
an internal combustion engine for burning a mixture of liquid fuel and air to produce useful power and heated exhaust gases, said engine having inlet means for receiving a fuel-air mixture and an outlet for discharging the heated exhaust gases;
a carburetor for mixing liquid fuel and air;
supply conduit means connected between said carburetor and said engine inlet;
a turbocharger having:
  a turbine connected to said engine outlet so as to be driven by the heated exhaust gases from said engine, and
  a compressor connected in said supply conduit means to receive a mixture of liquid fuel and air from said carburetor, compress such mixture, and deliver the compressed mixture to said engine inlet means;
said compressor and said engine inlet means being oriented such that liquid fuel being supplied by said compressor travels upwardly to reach said engine inlet such that portions of said liquid fuel tend to collect in a sump-defining portion of said supply conduit means between said compressor and said engine inlet means; and
pumping means having:
  an inlet communicating with said sump-defining portion,
  a pump for pumping fuel from said sump-defining portion, and
  an outlet communicating with said supply conduit means for directing said pumped fuel into a downstream portion of said supply conduit means at a location where the remaining extent of said supply conduit means is oriented to exclude subsequent upward travel of fuel to said engine inlet.

2. Apparatus according to claim 1 wherein the arrangement of said compressor and engine inlet means is such that liquid fuel tends to collect at the bottom of said compressor.

3. Apparatus according to claim 2 wherein said pump delivers said pumped fuel to said supply conduit means in a downward direction which corresponds to a downward direction of fuel-air flow in said supply conduit means.

4. In combination:
an internal combustion engine for burning a mixture of liquid fuel and air to produce useful power and heated exhaust gases, said engine having inlet means for receiving a fuel-air mixture and an outlet for discharging the heated exhaust gases;
a carburetor for mixing liquid fuel and air;
supply conduit means connected between said carburetor and said engine inlet;
a turbocharger having:
  a turbine connected to said engine outlet so as to be driven by the heated exhaust gases from said engine, and
  a compressor connected in said supply conduit means to receive a mixture of liquid fuel and air from said carburetor, compress such mixture, and deliver the compressed mixture to said engine inlet means;
said compressor and said carburetor being oriented such that liquid fuel being supplied by said carburetor travels upwardly to reach said compressor such that portions of said liquid fuel tend to collect in a sump-defining portion of said supply conduit means between said compressor and said carburetor; and
pumping means having:
  an inlet communicating with said sump-defining portion,
  a pump for pumping collected fuel from said sump-defining portion, and
  an outlet communicating with said supply conduit means for directing said pumped fuel into a downstream portion of said supply conduit means at a location where the remaining extent of said supply conduit means is oriented to exclude subsequent upward travel of fuel to said engine inlet.

5. Apparatus according to claim 4 wherein the arrangement of said carburetor and compressor is such that liquid fuel tends to collect within said supply conduit means between said carburetor and said compressor.

6. Apparatus according to claim 4 wherein said pump delivers said pumped fuel to said supply conduit means in a generally horizontal direction which corresponds to a general horizontal direction of fuel-air flow in said supply conduit means.

* * * * *